United States Patent
Nau

[11] 3,880,433
[45] Apr. 29, 1975

[54] PACKING CARRIER

[75] Inventor: Bernard S. Nau, Bedford, England

[73] Assignee: The British Hydromechanics Research Association, Cranfield, Bedford, England

[22] Filed: Dec. 21, 1972

[21] Appl. No.: 317,288

[30] Foreign Application Priority Data
Dec. 21, 1971 United Kingdom............ 059340/71
Sept. 1, 1972 United Kingdom............ 040678/72

[52] U.S. Cl..................................... 277/2; 277/17
[51] Int. Cl............................................. F16j 15/18
[58] Field of Search........................... 277/2, 17-21, 277/68, 69

[56] References Cited
UNITED STATES PATENTS

| 961,484 | 6/1910 | Comstock | 277/21 |
| 2,196,676 | 4/1940 | Johnson et al. | 277/30 |
| 2,509,162 | 5/1950 | Moses et al. | 277/68 |
| 2,673,103 | 3/1954 | Tremolada | 277/68 |
| 2,721,748 | 10/1955 | Tremolada | 277/30 |
| 2,761,709 | 9/1956 | Gilbert | 277/21 |

*Primary Examiner*—Robert I. Smith
*Attorney, Agent, or Firm*—Wolfe, Hubbard, Leydig, Voit & Osann, Ltd.

[57] ABSTRACT

A stuffing-box for sealing between an elongate member and a housing sleeve, in which packing material accommodated within a shouldered recess formed in the housing sleeve is pressed into contact with the elongate member by means of a loading medium introduced into the stuffing-box through ducting formed in the stuffing-box. Advantageously, the packing material is carried in a packing carrier which is mounted in the shouldered recess, and the packing material is in the form of a pre-formed packing sleeve, so as to permit the use of standardised packing sleeves and carriers for stuffing-boxes with shouldered recesses of different sizes.

36 Claims, 28 Drawing Figures

PACKING CARRIER

BACKGROUND OF THE INVENTION

The invention relates to packing sleeves suitable to use in stuffing boxes of pumps, mixers, compressors, valves and the like. The function of these stuffing-boxes is to prevent fluid leakage between a hollow member and an elongate member such as a pump shaft mounted within the hollow member.

It is normal practice in machinery subject to fluid leakage to mount shafts within cylindrical housings. The shaft is arranged so that there is an annular space between the shaft and the housing and this space is filled with a flexible material which forms a soft packing. This material is often a woven fibrous material impregnated with a lubricant. To seal the shaft with the housing, the soft packing is axially compressed by means of a gland. The gland has a sleeve fitting over the shaft, one end of the sleeve engaging the packing material and the other end of the sleeve being provided with a flange formed with holes which receive screw-threaded studs projecting from the housing. By tightening nuts mounted on the screw-threaded studs, in abutment with the flange, the gland is drawn towards the housing so that the sleeve compresses the packing material axially against a shoulder formed within the housing to form a soft packing "bush". Although the compression is applied axially, the flexibility of the soft packing material gives rise to a radial component of stress which makes the packing bush conform closely to the shaft and the housing and so form a seal. Mechanically loaded stuffing-boxes such as this frequently require adjustment of the load during operation because the stresses in the packing material are unevenly distributed and therefore change with time. Also the lack of standardisation of stuffing box dimensions frequently results in the use of non-optimum amounts of soft packing material and consequent failure to obtain the best sealing performance. Lack of standardisation also makes it necessary to have available packing material in many sizes.

SUMMARY OF THE INVENTION

It is an object of the present invention to facilitate the installation and removal of soft packing material for sealing an elongate member disposed within, and extending substantially parallel to the axis of, a housing sleeve.

It is also an object of the present invention to provide a packing carrier capable of supporting standardised sleeves of packing material.

It is a further object of the present invention to provide a stuffing-box in which periodic adjustment of the seal is effected much more simply or is eliminated.

According to the invention there is provided a packing sleeve comprising a pre-formed cylindrical bush of soft packing material.

To facilitate mounting of the packing sleeve on the shaft, where the cylindrical bush is of unitary construction, the cylindrical bush may be formed with a longitudinally extending slit or seam having separable edges.

The invention also provides a packing carrier for supporting a sleeve of packing material in sealing engagement with an elongate member mounted within the carrier for movement relative to the carrier, the carrier comprising a tubular part and means providing an inwardly directed axial abutment for the packing sleeve at one end of the tubular part. The tubular part may also be provided with an outwardly directed mounting flange at the opposite end to the means providing the axial abutment for the packing sleeve. The packing carrier is insertable in a stuffing-box or other apertured member which surrounds a shaft or other elongate member, and is co-operable with an annular cover member surrounding the shaft at the other end of the tubular part to define an annular cavity for the accommodation of a packing sleeve.

To facilitate the insertion of the packing sleeve within the packing carrier, and the removal of this packing sleeve, the tubular part of the carrier may be tapered towards the end of the tubular part which is provided with the inwardly directed axial abutment.

The use of standardised packing carriers makes it possible to provide the packing sleeves as pre-formed cylindrical bushes, as described above, of standard sizes and this considerably reduces the amount of compression required within the carrier during assembly to effect a seal. However, the packing carrier is not limited to use with pre-formed packing sleeves, but is suitable for use with conventional forms of packing material. The cover member need not be in the form of a gland having a tubular portion which surrounds the shaft and projects into the housing sleeve of the stuffing-box. Using a flat cover member enables the length of the shaft to be reduced to thereby reduce pump impeller overhang.

The invention further provides a stuffing-box comprising a housing sleeve which is internally relieved at one end to form a circumferential shouldered recess for accommodating packing material in a packing carrier disposed between the housing sleeve and an elongate member disposed within the housing sleeve and extending substantially parallel to the axis of the housing sleeve, a packing cover attached to said one end of the housing sleeve to form an outer abutment for the packing material, and fluid ducting formed in the stuffing-box for loading the packing material with a loading medium so as to provide a seal between the packing material and the elongate member.

Although a stuffing-box such as this is suitable for use with packing material mounted in a packing carrier, it is to be understood that packing material of a conventional nature or packing material in the form of a pre-formed sleeve may be mounted within the circumferential shouldered recess without the use of a packing carrier. In this case, access of the loading medium along and around the packing material may be improved by forming the internal surface of the circumferential shouldered recess with access grooving.

Thus, a stuffing-box co-operable with an internally disposed elongate member, as described above, may be provided with packing material disposed within the shouldered recess, and a loading medium disposed between the packing material and a surface enclosing the packing material and effective to compress the packing material to thereby form a seal between the packing material and the elongate member.

The loading medium may be any substance capable of flow and pressurisation. For example, the loading medium may be a grease, oil, plastics or any other fluid introduced into the shouldered recess through the fluid ducting. The loading medium need not necessarily retain its fluid properties once it has been fed into the stuffing box if, on solidification, the loading medium retains the ability to exert a stress.

The loading medium may be introduced into the stuffing-box by any suitable means. For example, a grease nipple may be provided at the outer end of the fluid ducting and the loading medium may be introduced by means of a grease-gun applied to this grease nipple. Alternatively, the stuffing-box may be supplied from a centralised lubrication system. As another alternative, the loading medium may be pressurised by an independent pressure source or by pressure provided by the fluid sealed by the stuffing-box, for example: a differential piston arrangement could be suitable connected to a pump discharge to pressurise the loading medium to a pressure greater than, equal to, or less than the pump discharge. The loading medium could be introduced by a hand-pump. A pressure relief valve may be provided to avoid overloading the packing material as a result of over pressurisation of the loading medium.

The loading medium may apply to the packing in the stuffing-box a radial load, an axial load, or a combination of the two. The fluid ducting for the introduction of the loading medium may be formed in the wall of the housing sleeve or packing carrier, through the cover member of the stuffing-box, or through independent means.

A particular advantage of the radially loaded embodiments of this invention is that the stuffing-box can be loaded or subsequently adjusted remotely, the loading pressure can also be indicated remotely by fitting a suitable pressure indicator.

Another advantage of the radially loaded embodiments of this invention is that the radial sealing stress is more uniformly distributed along the packing material, whereas in a conventional stuffing-box most of the radial sealing stress is concentrated near the outer end of the packing material.

The packing carrier may be mounted so as to extend away from the housing sleeve surrounding the elongate member. However, where the packing carrier extends within the housing sleeve an additional advantage is obtained in that fluid circulating in contact with the outer surface of the tubular part of the packing carrier provides an effective means of heat transfer from the packing material and thereby facilitates removal of frictional heat generated between the relatively movable surfaces of the packing material and the shaft. To improve this heat transfer, the packing carrier may be provided with external fins, corrugations or other protuberances. It is also possible to provide a multiple walled packing carrier in which closed or open interspaces are provided between adjacent walls. The spaces so enclosed may be evacuated, gas filled, or filled with some other insulating material to provide a thermal barrier to protect the packing material, or a liquid or other fluid may be circulated through these spaces so as to provide heating or cooling.

It is also possible to support the packing carrier in a flexible mounting. This is advantageous where the shaft is subject to run-out or misalignment. Where the packing carrier is flexibly mounted, the packing cover may also be flexibly mounted either independently or in conjunction with the packing carrier.

Where the packing material is provided in the form of packing sleeves, in accordance with the invention, these packing sleeves may be provided with means for facilitating the distribution of loading medium and, in a preferred embodiment, the means for distributing the loading medium may comprise a substantially cylindrical cage-like structure fitted around the external periphery of the cylindrical bush.

Where a cage-like structure such as this is used, the cylindrical bush may comprise two or more complementary preformed parts which together form a cylindrical bush, or may consist of one or more lengths of circumferentially wound packing material. In such a construction, the cage-like structure provides the packing sleeve with structural integrity. Similarly, a cage-like structure for facilitating the distribution of loading medium around a cylindrical bush formed with a longitudinally extending slit may also serve to provide the bush with structural integrity.

In alternative methods of improving the access of the loading medium along and around the packing sleeve, the outer cylindrical surface of the packing sleeve may be formed with indentations and/or raised areas.

DESCRIPTION OF THE DRAWINGS

Apparatus embodying the different aspects of the invention is hereinafter described by way of example only, with reference to the accompanying drawings, in which.

DESCRIPTION OF PREFERRED EMBODIMENTS

Figure 1:
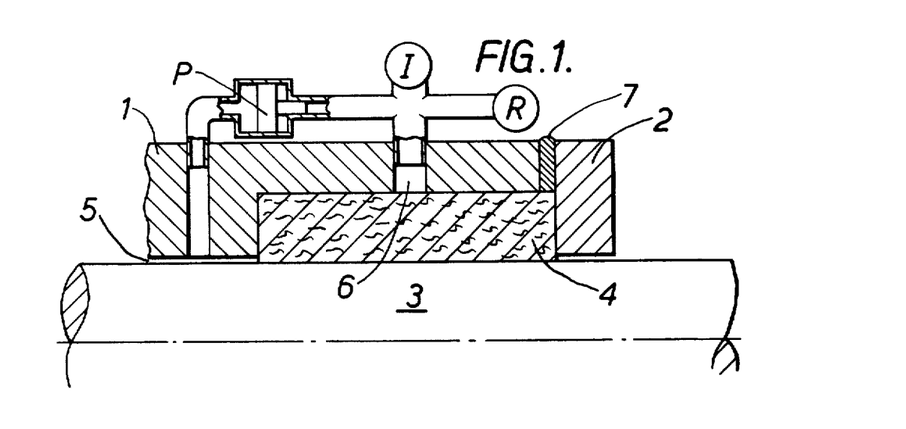
FIG. 1 is a schematic half section of part of a stuffing-box according to the invention, a shaft mounted within the stuffing-box and a sleeve of packing material.

As shown in FIG. 1, the stuffing-box has a housing sleeve 1 fitted with a cover member 2 and is disposed around a shaft 3. The housing sleeve is internally relieved along part of its length to provide a shouldered recess and a packing sleeve 4 of suitable packing material is disposed within the shouldered recess between the sleeve 1 and the shaft 3 to prevent leakage of fluid from the annular space 5 between the housing sleeve 1 and the shaft 3.

A duct 6 is formed in the sleeve 1 for the introduction of pressurised grease, from a differential piston P which is subjected, on one side, to the fluid in annular space 5, into the shouldered recess to thereby press the packing sleeve 4 into sealing engagement with the shaft 3. A sealing gasket 7 is provided between the end of the housing sleeve 1 and the cover member 2.

On the introduction of pressurised grease into the shouldered recess, the grease flows between the packing material and the adjacent surfaces of the housing sleeve 1 and the cover member 2. As the pressure of the grease increases, the packing sleeve 4 is pressed radially into sealing engagement with the shaft 3. A pressure relief valve R ensures that the pressure acting on the packing sleeve does not exceed a predetermined level, the actual pressure of the grease being shown by an indicator I.

Figure 2:
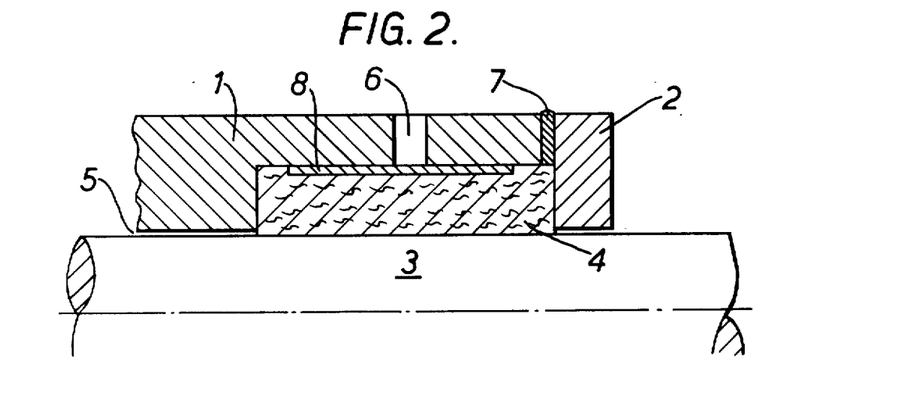
FIG. 2 is a schematic half section of a similar arrangement to that shown in FIG. 1, in which the packing material is provided with loading madium distributing means.

In the arrangement shown in FIG. 2, the packing sleeve 4 is wrapped in a layer of wire gauze 8. On injection through duct 6, pressurised grease passes through the wire gauze 8 and more readily into the space between the packing sleeve 4 and the housing sleeve 1 so as to provide more uniformly distributed radial loading on the packing sleeve 4.

The wire gauze 8 may be provided in the form of a continuous circumferential band, or may be of split or of composite construction to facilitate assembly around a shaft without requiring access to the shaft end. Where the layer of wire gauze 8 is provided with free ends, means may be provided for joining these ends to effectively re-establish its circumferential continuity. The layer of wire gauze 8 need not be positioned centrally of the packing sleeve 4 and may, with advantage, be used with a preformed packing sleeve 4 comprising one or more parts.

Figure 3:
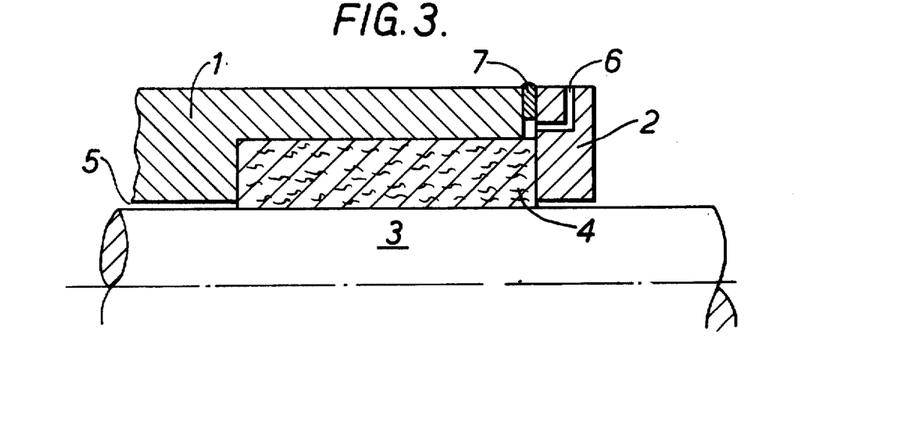
FIG. 3 is a half section of an arrangement similar to that shown in FIG. 1, in which a fluid duct for the introduction of fluid medium into the stuffing-box is formed in a cover member of the stuffing-box.

The arrangement shown in FIG. 3 differs from the arrangement shown in FIG. 1 in that the duct 6 is formed in the cover member 2 rather than the housing sleeve 1.

Figure 4:
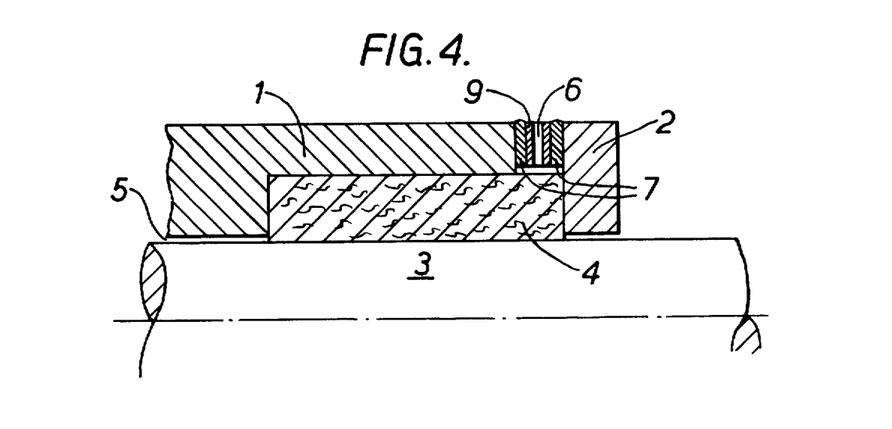
FIGS. 4 and 5 show parts of an arrangement similar to that shown in FIG. 1, in which the fluid duct is formed in a ring sealed between the cover member of the stuffing-box and a housing sleeve forming part of the stuffing-box.
Figure 5:
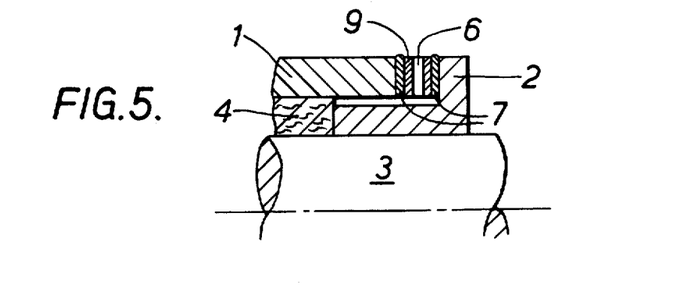

In the arrangement shown in FIGS. 4 and 5 the duct 6 is formed in a ring member 9 disposed between the end of the housing sleeve 1 and the cover member 2. Sealing gaskets 7 are provided between the housing sleeve 1 and the ring member 9 and between the ring member 9 and the cover member 2. The cover member 2 shown in FIG. 5 is constructed in the form of a gland with a central tubular-shaped portion which projects into the end of the housing sleeve 1. Thus, by using a sealing ring 9, as described above, a conventional stuffing-box may be converted into a stuffing-box according to the present invention by using the gland of the conventional stuffing-box as the cover member 2.

In the construction illustrated in FIGS. 4 and 5, the sealing ring 9 may be in one piece or split for ease of assembly. Where the sealing ring 9 is of split construction, means may be provided for rejoining the parts so as to form an effectively continuous ring.

Figure 6:
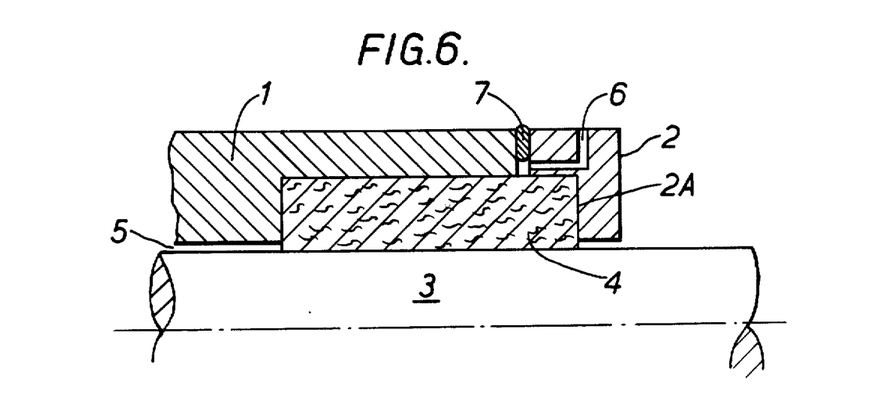
FIG. 6 is a schematic half section of an arrangement similar to that shown in FIG. 3, in which the cover member is modified so as to reduce leakage of the loading medium between the packing material and the cover member.

Various measures may be adopted to prevent leakage of loading medium between the packing sleeve 4 and the cover member 2. One such measure illustrated in FIG. 6, involves formation of the cover member 2 with a shouldered recess to accommodate the outer end of the packing sleeve 4. The axially facing inner surface 2A of the recess formed in cover member 2 may be roughened or profiled to further reduce leakage of loading medium.

Figure 7:
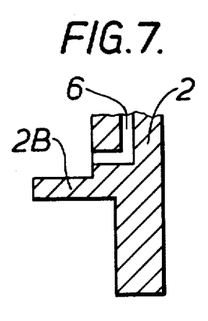
FIGS. 7 to 13 are part sections of seven different forms of cover member suitable for reducing leakage of the loading medium between the packing material and the cover member.
Figure 8:
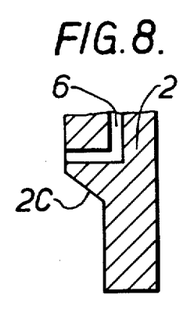

In the modified version of the cover member 2 shown in FIGS. 7 and 8, the shouldered recess in the cover member 2 is provided with a projection 2B and an inclined upper surface 2C, respectively. The projection 2B serves to increase the leakage path of the loading medium whereas the inclined upper surface 2C serves to provide a wedging effect on the end of the packing sleeve 4 to form a tighter seal.

Figure 9:
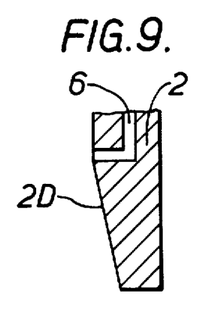
Figure 10:
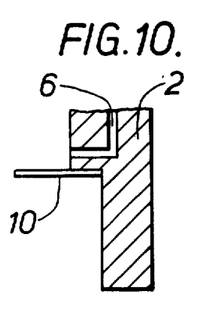

The cover member 2 illustrated in FIG. 9 is not formed with a shouldered recess, but the axially facing surface 2D of the cover member is inclined so as to provide a wedging effect on the outer end of the packing sleeve 4.

Figure 11:
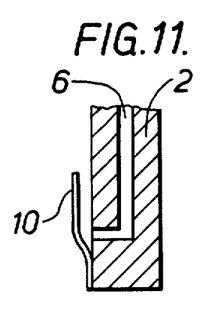
Figure 12:
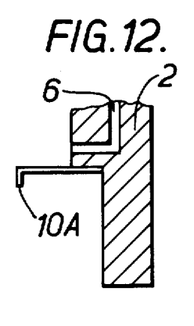
Figure 13:
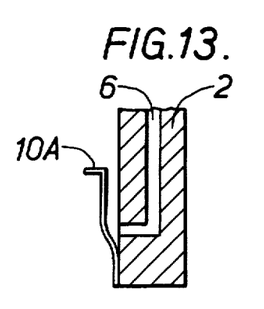

Diaphragms 10 are employed in the constructions illustrated in FIGS. 10 to 13. In the construction illustrated in FIG. 10, the diaphragm is bonded or otherwise fixed to the circumferential surface of a shouldered recess formed in the cover member 2 and projects beyond the inner axially facing surface of the cover member to lengthen the leakage path of the loading medium and act as a pressure energised seal to control leakage of the loading medium. In the construction illustrated in FIG. 11 the diaphragm 10 is bonded or otherwise fixed to the inner axially facing surface of the cover member 2. This diaphragm 10 is of resilient material and is preformed so that, when unstressed, the outer portion of this diaphragm stands proud of the inner axially facing surface of the cover member 2. In operation, the pressure of the loading medium inside the stuffing-box tends to press the diaphragm 10 against the axially outer surface of the packing sleeve 4 to thereby reduce leakage of the loading medium radially inwards, the sealing effect increasing with increase in pressure in the loading medium. Clearly, it is not necessary to preform the diaphragm 10 as shown in FIG. 11, and a flat diaphragm may be used. The lip 10 in FIGS. 12 and 13 further limits loading medium leakage by embedding in the soft packing.

Figure 14:
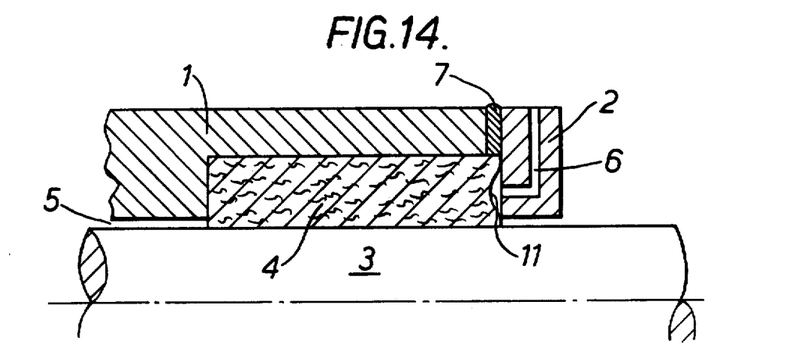
FIGS. 14 to 16 are schematic half sections of arrangements similar to that shown in FIG. 1, showing three different constructions in which additional means are provided for separating the loading medium from the fluid to be sealed.

Various measures may also be adopted for ensuring that the loading medium and the liquid to be sealed remain isolated from each other. In the embodiment illustrated in FIG. 14, a flexible diaphragm 11 is provided between the outer axially facing surface of the packing sleeves 4 and the outlet of a duct 6 formed in cover member 2. On injection of loading medium through the duct 6, the diaphragm 11 is deformed as the loading medium applies pressure to the packing sleeve 4. Such a diaphragm could also be applied to the arrangement shown in FIG. 1.

Figure 15:
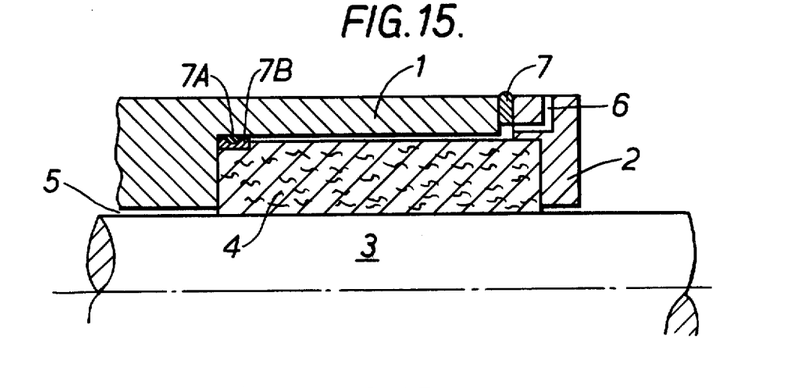
Figure 16:
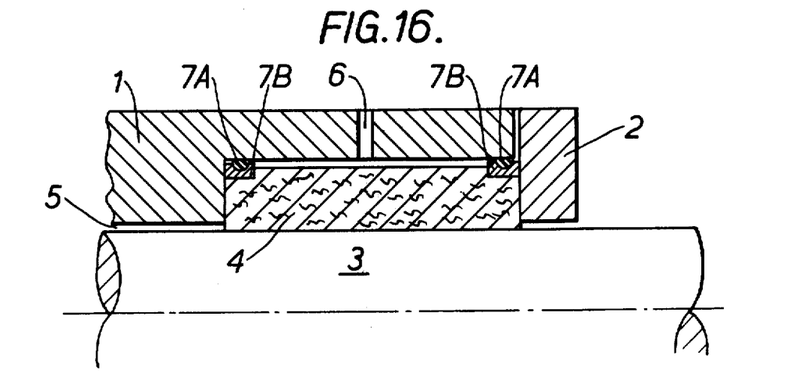

In the constructions illustrated in FIG. 15 and 16, O-rings 7A are disposed between the radially outer surface of the packing sleeve 4 and the radially inner surface of the shouldered recess formed in the housing sleeve 1. As shown, these O-rings 7A may be seated in ring members 7B embedded in the outer surface of the packing sleeve 4. The single O-ring 7A provided in the construction illustrated in FIG. 15 is disposed in the inner end of the packing sleeve 4, but as shown in FIG. 16 a further O-ring 7A may be disposed at the outer end of the packing sleeve 4 to prevent leakage of loading medium past the cover member 2. In this construction it is not necessary to provide a gasket between the housing sleeve 1 and the cover member 2.

The O-ring carrier at the inner end of the packing sleeve 4 may be joined to a flexible diaphragm around the outside of the packing sleeve so that the loading medium does not contact the packing sleeve. The outer end of the diaphragm may be joined to the cover member 2 or to an outer O-ring carrier. in another embodiment the or each O-ring and carrier, may be moulded as one piece with the diaphragm.

Although the seals of the embodiment illustrated in FIGS. 15 and 16 consist of O-rings 7A, other seals are also suitable. Similarly, seals may be disposed between the axially facing surfaces of the packing sleeve and the stuffing-box instead of between radially spaced surfaces as illustrated.

Figure 17:
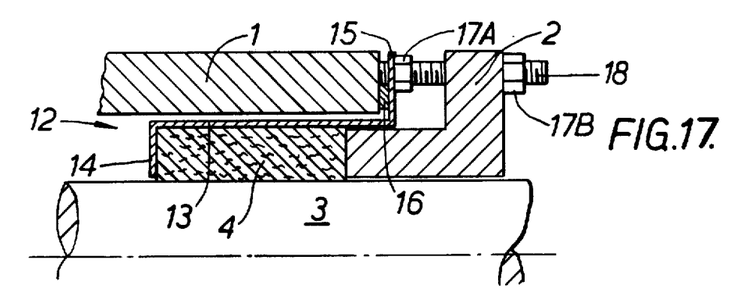
FIGS. 17 to 20 are half-sectional views of part of a shaft mounted in conventional stuffing-boxes having packing sleeves supported in packing carriers according to the present invention.

In the arrangement shown in FIG. 17 a conventional stuffing-box has a housing sleeve 1 which is cooperable with a cover member 2 in the form of a gland to seal a shaft 3 by means of a standardised packing sleeve 4. The packing sleeve 4 is mounted within a top-hat shaped packing carrier 12 which consists of a tubular part 13 having an inwardly directed annular flange 14 at its inner end and an outwardly directed annular flange 15 at its outer end. The flange 15 is pressed against a gasket 16 abutting the end of the housing sleeve 1 by means of nuts 17A (only one of which is shown) mounted on screw-threaded studs 18 projecting from the housing sleeve 1. The studs 18 project through apertures formed in the outer periphery of the flange 15 and the packing cover 2, and is adjusted by means of a further nut 17B mounted on the studs 18. Clearly, the disposition of the packing carrier 12 within the housing sleeve 1 may be varied by the insertion of a spacer ring or additional or thicker gaskets 16 so that the packing sleeve may be suitably positioned.

Figure 18:
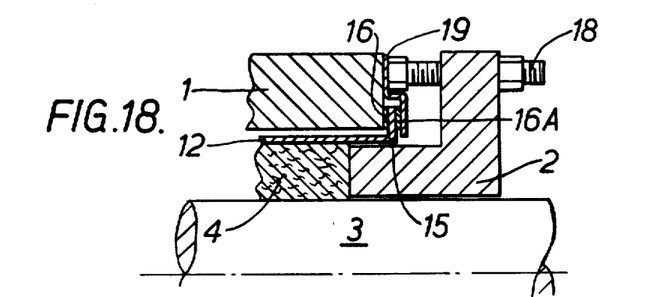

As shown in FIG. 18, the packing carrier 12 is located by means of a dished retaining ring 19 which, at its outer periphery, is formed with apertures for the reception of the studs 18, and which, at its inner periphery, clamps the flange 15 of the packing carrier 12. As shown, an additional gasket 16A is inserted between the retaining ring 19 and the flange 15. To allow for flexibly mounting the packing carrier 12, the gaskets 16 and 16A may both be of an elastomeric material.

Figure 19:
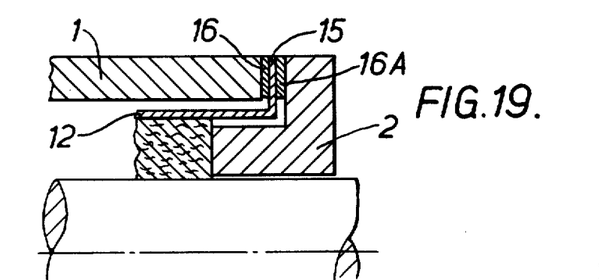

In the modification shown in FIG. 19, the gland constituting the cover member 2 serves as the retaining ring for the packing carrier 12 in that the flange 15 of the packing carrier 12 is clamped between the end of the housing sleeve 1 and the cover member 2. As shown, gaskets 16 and 16A are mounted between the end of the housing sleeve 1 and the flange 15 and between the flange 15 and the cover member 2, and these gaskets 16 and 16A may both be of elastomeric material so as to provide some flexibility in the mounting of the packing carrier 12.

Figure 20:
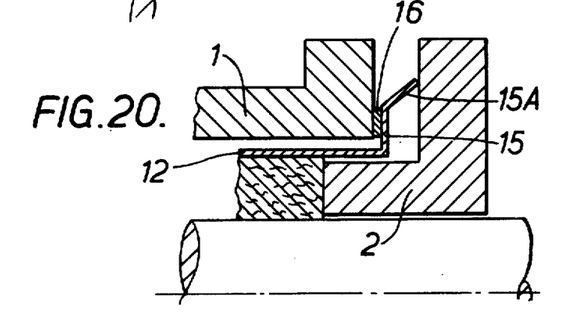

In the arrangement shown in FIG. 20, the outwardly directed flange 15 is provided with a frusto-conical rim 15A which is deformable by the gland forming the cover member 2 on movement of the gland into the packing carrier 12. This form of packing carrier is simple to manufacture but is not generally suitable for reuse after the frusto-conical rim 15A has been flattened. As an alternative to the construction shown in FIG. 20, the frusto-conical rim 15A may be directed in the opposite direction towards the housing sleeve 1. Although the rim may form a complete frusto-conical ring, as shown, it may also consist of spaced parts of such a ring.

Figure 21:
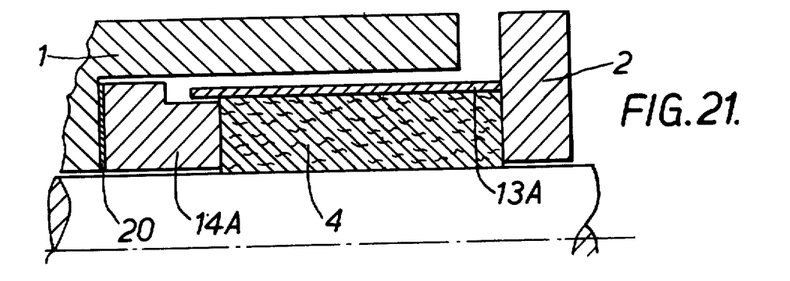
FIGS. 21 to 24 are half-sectional views of part of a shaft mounted in modified stuffing-boxes incorporating packing carriers according to the invention.

In the stuffing-box arrangement shown in FIG. 21, which is particularly suitable for a radially separable packing carrier, the packing carrier comprises a two-piece tubular part 13A which can be mounted without access to the shaft end, the two pieces of this tubular part being mounted on a relieved portion of the stepped outer periphery of an end ring 14A which provides the inwardly directed annular axial abutment at the inner end of the tubular part 13A. As shown the end ring 14A is separated from a shoulder formed in the stuffing-box by means of a seal such as gasket 20, but this may be replaced by a tubular gasket or other seal disposed between the opposed cylindrical surfaces of the end ring 14A and the housing sleeve 1 of the stuffing-box. The cover member 2 for the packing sleeve 4 accommodated by the packing carrier is formed with apertures for receiving studs (not shown) extending from the housing sleeve 1 of the stuffing-box. However, it is also possible to provide a cover member 2 in the form of a gland, as shown in FIGS. 17 to 20.

Figure 22:
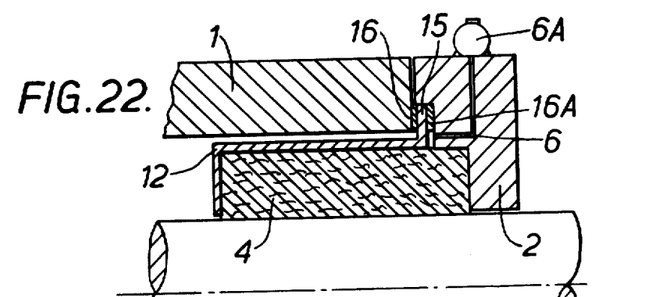

In the arrangement shown in FIG. 22, the flange 15 of the packing carrier 12 is clamped between two gaskets 16 and 16A respectively abutting the end of the housing sleeve 1 of the stuffing-box and the cover member 2, and the cover member 2 is formed with a duct 6 connected to a grease nipple 6A, and grease may thus be forced between the packing sleeve 4 and the enclosing surfaces of the packing carrier 12 and the cover member 2 so as to load the bush in the manner hereinbefore described. In this respect it is noted that the grease nipple 6A may be replaced by any of the pressurised fluid means referred to hereinbefore.

Figure 23:
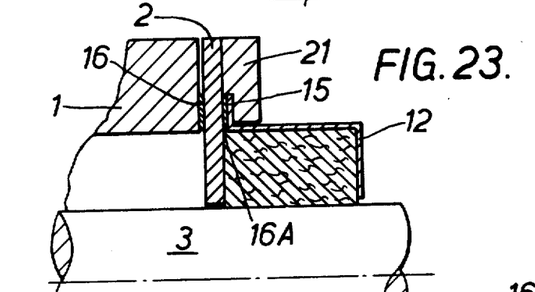
Figure 24:
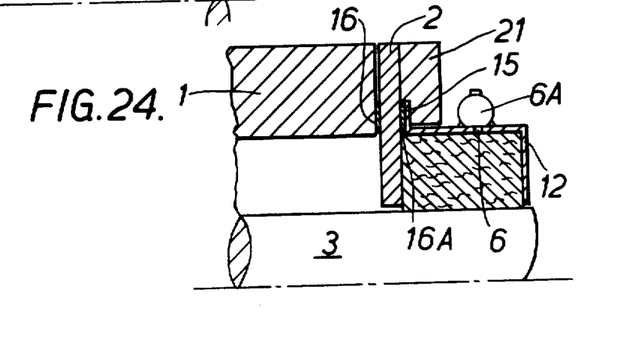

In the embodiments set out in FIGS. 23 and 24, the apertured member within which the packing carrier 12 is mounted constitutes a clamping ring 21. This clamping ring 21 clamps cover member 2 to the end of the housing sleeve 1 of a stuffing-box within which the shaft 3 is mounted and also clamps the outwardly directed flange 15 of the packing carrier 12. However, in this case, the packing carrier 12 does not project into the stuffing-box, but projects outwardly, in the opposite direction. As shown, gaskets 16 and 16A are mounted between the hollow housing sleeve 1 and the cover member 2 and between the cover member 2 and the clamping ring 21, although other sealing means may be used.

As shown in FIG. 24, a grease nipple 6A mounted on the packing carrier 12 communicates with an aperture 6 in the packing carrier 12 for the injection of pressurised grease to load the packing material.

In all the constructions illustrated in FIGS. 17 to 24, the gaskets 16 and 16A may be bonded in situ for convenience of handling and may be of any suitable material including rubber and rubber-based materials, asbestos and asbestos-based materials, and plastics. Metallic gaskets and seals such as O-rings etc. can also be used.

The packing carriers described above may be of metal or plastics or other materials and can be moulded, deep drawn, fabricated or otherwise manufactured, and the tubular part of a packing carrier may be tapered such that the diameter at the open end is greater than at the closed end. The taper facilitates the installation and removal of the packing sleeves. some or all of the components forming and co-operating with the packing carrier may be in two or more parts for assembly around a shaft without access to the shaft end, for instance the carrier may be split axially and clipped together for rejoining round the shaft. The parts may alternatively have axially extending flanges for joining. The joins in split carriers may be sealed by a gasket or sealing compound.

Figure 25:
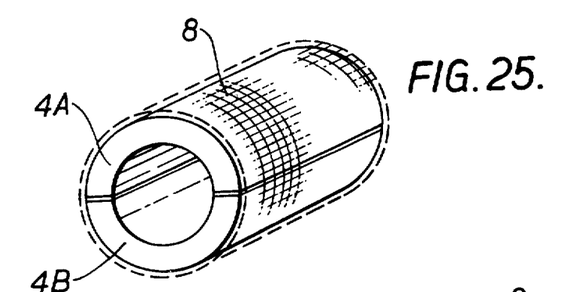
FIGS. 25 to 28 are perspective views of four different forms of packing sleeves according to the invention.
Figure 26:
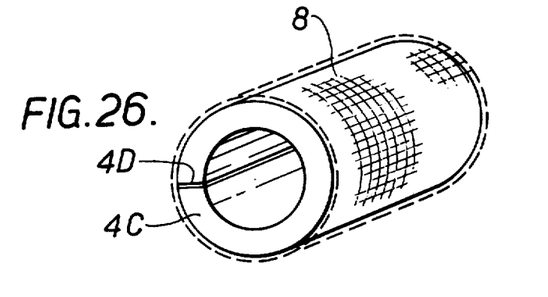

In the packing sleeves 4 shown in FIGS. 25 to 26, a pre-formed cylindrical bush of packing material is enclosed by a sleeve 8 of wire gauze which, when the packing sleeve is inserted within a packing carrier or stuffing-box according to the invention, serves to facilitate infiltration of loading medium around the outer cylindrical surface of the bush to thereby assist in the uniform distribution of radial loading on the material of the packing sleeve.

In the packing sleeve shown in FIG. 25, the bush is made up of two semi-cylindrical parts 4A and 4B. These parts may be separately mounted on opposite sides of a shaft extending from a stuffing-box, and the wire gauze sleeve 8 may be provided in the form of a strip which may be wrapped around the two parts 4A, 4B and secured in position.

Similar strips of wire gauze material may be used in the embodiment illustrated in FIG. 26, where the packing sleeve 4C is formed with a longitudinal slit 4D which may be opened to mount the packing sleeve on a shaft.

Figures 27, 28:
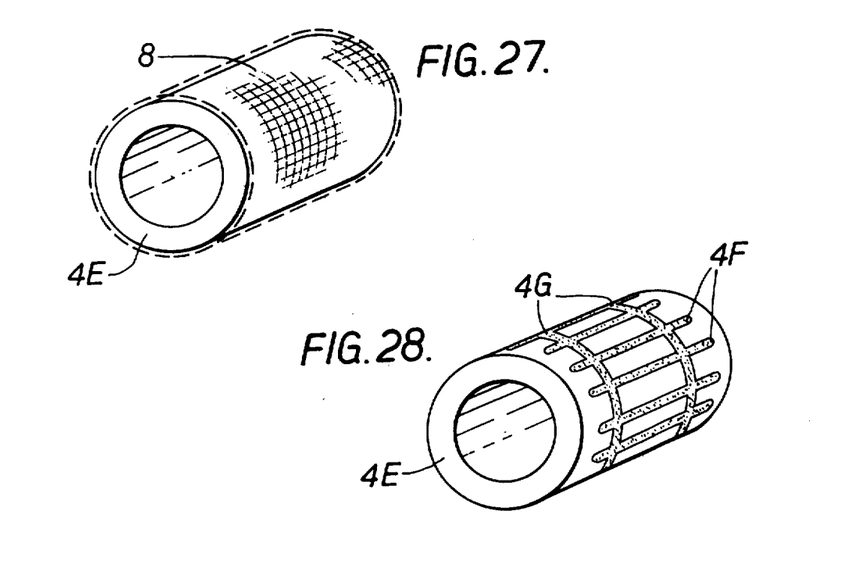

The packing sleeves 4E illustrated in FIGS. 27 and 28 consist of a one piece bush 4E of packing material, but the sleeve 4E shown in FIG. 28, is formed with a plurality of longitudinally extending grooves 4F which are interconnected by two circumferentially extending grooves 4G instead of the wire gauze sleeve 8 shown in FIG. 27, for the distribution of the loading medium.

Although the invention has been described with reference to different specific embodiments and with reference to general constructional principles, it will be understood that the invention also covers compatible combinations of the different features of the different embodiments and different constructional principles.

We claim:

1. A packing sleeve for a rotary seal comprising a pre-formed cylindrical bush of soft compression packing formed of deformable fibrous material and a substantially cylindrical wire gauze enclosing said bush, said bush comprising two pre-formed, semi-cylindrical components which abut each other at separate edges defining two longitudinally extending seams.

2. A rotary shaft seal comprising a packing sleeve according to claim 1 and a packing carrier for supporting said packing sleeve in sealing engagement with a shaft mounted within the packing carrier for rotary movement relative to the packing carrier, said packing carrier comprising a tubular part which is tapered to facilitate insertion and removal of the packing sleeve, an outwardly directed mounting flange formed integral with said tubular part at said one end of the tubular part, means formed integral with said tubular part providing an inwardly directed axial abutment for the packing sleeve at the opposite end of the tubular part, a packing cover providing an outer abutment for the packing sleeve and securing the outwardly directed mounting flange to an apertured member formed with an aperture through which the shaft projects and resilient sealing means disposed between the packing cover and the outwardly directed mounting flange of the packing carrier and between the outwardly directed mounting flange and the apertured member, the packing cover being formed with fluid ducting and provided with a grease nipple communicatively connected to the ducting for loading the packing sleeve so as to provide a seal between the packing sleeve and the shaft.

3. A rotary shaft seal comprising a packing sleeve according to claim 1, and a packing carrier for supporting said packing sleeve in sealing engagement with a shaft mounted within the carrier for rotary movement relative to the carrier, the carrier comprising a tubular part, an outwardly directed mounting flange formed integral with said tubular part at one end of the tubular part, and means formed integral with said tubular part providing an inwardly directed axial abutment for the packing sleeve at the opposite end of the tubular part.

4. A rotary shaft seal according to claim 3, in which the packing carrier includes clamping means for securing the outwardly directed mounting flange to the open end of an apertured member forming an aperture through which the shaft projects.

5. A rotary shaft seal according to claim 4, including resilient sealing means for engagement between the clamping means and the outwardly directed mounting flange and between the outwardly directed mounting flange and the apertured member.

6. A rotary shaft seal according to claim 4, in which the clamping means are co-operable with securing means for securing a packing cover, providing an outer abutment for the compression packing, to the apertured member.

7. A rotary shaft seal according to claim 4 in which the clamping means comprises a dished clamping ring with an outer rim engageable with the apertured member and an inner rim for securing the outwardly directed mounting flange of the packing carrier.

8. A rotary shaft seal according to claim 4, in which the clamping means of the packing carrier comprises a packing cover which is co-operable with securing means for connecting the packing cover to said apertured member.

9. A rotary shaft seal according to claim 3, in which the packing gland is provided with a flange and the outwardly directed mounting flange of the packing carrier is provided with a deformable, frusto-conical rim disposed between the apertured member and the flange provided on the gland.

10. A rotary shaft seal according to claim 3, in which fluid ducting is provided in the packing cover for loading the bush of compression packing so as to provide a seal between the compression packing and the shaft.

11. A rotary shaft seal according to claim 3, in which the tubular part tapers towards said one end to facilitate the insertion and removal of the packing sleeve.

12. A rotary shaft seal according to claim 7, in which the packing cover comprises a packing gland which has a sleeve portion which is co-operable with the tubular part of the packing carrier.

13. A stuffing box for sealing a rotary shaft, said stuffing box comprising a housing sleeve, a packing sleeve comprising a preformed cylindrical bush of soft compression packing formed of deformable fibrous material, a substantially cylindrical wire gauze enclosing said bush, said bush comprising two preformed, semi-cylindrical components which abut each other at separate edges defining two longitudinally extending seams, a packing carrier supporting said packing sleeve in sealing engagement with a shaft mounted within the carrier for rotary movement relative to the carrier, the carrier comprising a tubular part, an outwardly directed mounting flange formed integral with said tubular part at one end of the tubular part, and means formed integral with said tubular part providing an inwardly directed axial abutment for the packing sleeve at the opposite end of the tubular part, said carrier being disposed within the housing sleeve to seal the rotary shaft for rotation about an axis extending substantially parallel to the axis of the housing sleeve, a packing cover attached to one end of the housing sleeve to form an outer abutment for the compression packing, and fluid ducting formed in the stuffing box for loading the packing with a fluid loading medium so as to provide a seal between the compression packing and the rotary shaft.

14. A stuffing box according to claim 11, in which the ducting includes a duct formed in the tubular part of the packing carrier.

15. A stuffing box according to claim 13, in which the ducting includes a duct formed in a ring which is mounted between the open end of the housing sleeve and the cover member.

16. A stuffing box according to claim 15, in which the ring is of split construction.

17. A stuffing box according to claim 13, in which the ducting includes a duct formed in the packing cover.

18. A stuffing box according to claim 13, in which the packing cover is provided with a frusto-conical internal surface which is engageable with the outer end of the compression packing so as to provide a wedging effect.

19. A stuffing box according to claim 13, in which the packing cover is provided with an annular section projection having an inner surface engageable with the outer surface of the packing material.

20. A stuffing box according to claim 17, in which the packing cover is provided with a diaphragm extending between the packing material and the outlet of the duct formed in the packing cover.

21. A stuffing box according to claim 20, in which the diaphragm is in the form of a hollow cylinder.

22. A stuffing box according to claim 20, in which the diaphragm is in the form of an annulus connected to the packing cover at its radially outer edge.

23. A stuffing box according to claim 13, in which a grease nipple is provided at the outer end of the fluid ducting.

24. A stuffing box according to claim 13, in which the fluid ducting is connected to a source of fluid pressure.

25. A stuffing box according to claim 24, in which the source of fluid pressure includes a differential piston which is arranged to be subjected, on one side, to pressurised fluid which is sealed by the stuffing box.

26. A stuffing box according to Claim 13, including a pressure relief valve for the loading fluid.

27. A stuffing box according to claim 13, including a pressure indicator for indicating the pressure of the loading fluid.

28. A stuffing box according to claim 13, in which said tubular part of said packing carrier is tapered to facilitate insertion and removal of the packing sleeve.

29. A stuffing box according to claim 13, in which the rotary shaft seal includes clamping means for securing the outwardly directed mounting flange of the packing carrier to the open end of the housing sleeve.

30. A stuffing box according to claim 29, including resilient sealing means for engagement between the clamping means and the outwardly directed mounting flange and between the outwardly directed mounting flange and the open end of the housing sleeve.

31. A stuffing box according to claim 29, in which the clamping means are co-operable with securing means for securing the packing cover to the open end of the housing sleeve.

32. A stuffing box according to claim 13, including a dished clamping ring for securing the outwardly directed mounting flange of the packing carrier to the open end of the housing sleeve, the dished clamping ring having an outer rim engageable with the end of the housing sleeve and an inner rim for securing the outwardly directed mounting flange of the packing carrier.

33. A stuffing box according to claim 13, in which the packing cover serves as clamping means for securing the outwardly directed mounting flange of the packing carrier to the open end of the housing sleeve.

34. A stuffing box according to claim 13, in which the packing cover constitutes a packing gland and has a sleeve portion which is co-operable with the tubular part of the packing carrier.

35. A stuffing box according to claim 34, in which the packing gland is provided with a flange and the outwardly directed mounting flange of the packing carrier is provided with a deformable, frusto-conical rim for engagement between the end of the housing sleeve accommodating the shaft and the flange provided on the gland.

36. A stuffing box for sealing a rotary shaft, said stuffing box comprising a housing sleeve, a rotary shaft seal disposed within the housing sleeve to seal the shaft for rotation about an axis extending substantially parallel to the axis of the housing sleeve, a packing cover attached to the housing sleeve to form an outer abutment for a packing sleeve forming part of the rotary shaft seal and formed with fluid ducting, resilient sealing means disposed between the packing cover and an outwardly directed mounting flange forming part of the rotary shaft seal and between said outwardly directed mounting flange and the housing sleeve and a grease nipple communicatively connected to the ducting for loading the packing sleeve with grease so as to provide a seal between the packing sleeve and the shaft, the rotary shaft seal comprising the packing sleeve and a packing carrier for supporting the packing sleeve in sealing engagement with the shaft and comprising a tubular part which is tapered to facilitate insertion and removal of the packing sleeve, said outwardly directed mounting flange formed integral with the tubular part at said one end of the tubular part and means formed integral with the tubular part providing an inwardly directed axial abutment for the packing sleeve at the opposite end of the tubular part, the packing sleeve comprising a substantially cylindrical bush of soft compression packing formed of deformable fibrous material, a substantially cylindrical wire gauze enclosing said bush, said bush comprising two preformed, semi-cylindrical components which abut each other at separable edges defining two longitudinally extending seams.

* * * * *